July 3, 1951          H. B. McGLADE          2,559,084

ILLUMINATED FISHING FLOAT

Filed Feb. 17, 1947

Inventor
Hugh B. McGlade

By W. S. McDowell
Attorney

Patented July 3, 1951

2,559,084

UNITED STATES PATENT OFFICE 2,559,084

ILLUMINATED FISHING FLOAT

Hugh B. McGlade, Columbus, Ohio

Application February 17, 1947, Serial No. 729,063

1 Claim. (Cl. 43—17.5)

My invention deals with fishing tackle, and more particularly with fishing floats or bobs.

The general object of my invention is to provide an inexpensive fishing float embodying illuminating means whereby the fisherman is afforded visual reference to the float at all times during night fishing.

It is another object of this invention to provide a fishing float of the above character which comprises a lightweight buoyant float body in which is detachably held a relatively small dry cell battery, the latter serving to supply electrical currents to a small electric light bulb disposed so as to project above the upper surface of the float body and afford constant illumination in the region of the float.

It is a further object of my invention to provide a fishing float of this character which utilizes as a power source an ordinary pocket-type flashlight cell; the same being relatively inexpensive in cost and capable of facile installation within the associated float body, and which, when the same becomes expended, may be easily replaced.

For a more complete and detailed understanding of the present invention, reference is made to the following description and accompanying drawing, wherein.

Figure 1:
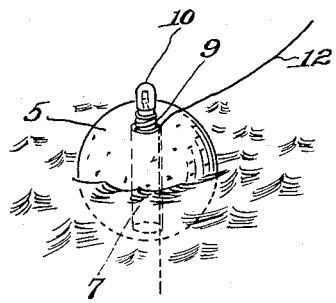
Fig. 1 is a perspective view of my improved illuminated fishing float.
Figure 2:
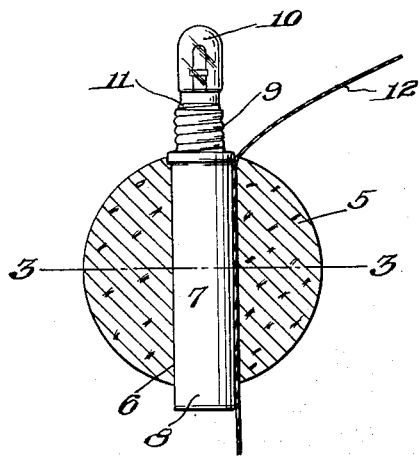
Fig. 2 is a vertical sectional view taken through the center of the float.
Figure 3:
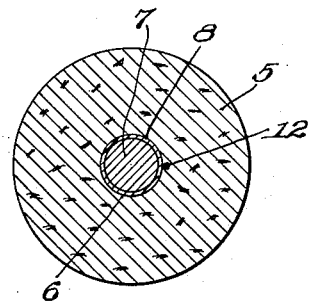
Fig. 3 is a horizontal sectional view taken along a plane indicated by the line 3—3 of Fig. 2.

Referring more particularly to the drawing, it will be noted that my invention makes use of a substantially spherical float body 5 formed from cork, wood, rubber or other suitably buoyant material. The float body 5 is formed with a centrally disposed open bore 6 which serves to receive and frictionally retain an elongated dry cell battery 7 similar to the ordinary pocket flashlight-type. In batteries of this type, there are normally two electrical poles, namely, the outer metallic casing 8 and a circular metallic contact point, not shown, disposed at the upper end of the battery substantially in the center thereof and electrically insulated from the casing 8. To afford current from the battery to a current-receiving device, it is necessary that contact be made with each of these poles. For this purpose, an internally threaded metallic socket 9 is soldered or otherwise suitably joined with the upper edge of the battery casing 8 to form an electrical contact therewith. The socket is substantially circular in cross-sectional configuration and is disposed around the end pole of the battery in order that a small electric light bulb 10, having a metallic screw-threaded base 11, may be screwed into the socket to make contact with each of the two poles of the battery, thereby making an operating circuit for the bulb.

In using the present float, an associated fishing line 12 is directed through the bore of the float body 5 for a length corresponding to the desired depth of the hook-retaining end of the line. The battery 7 is then inserted bottom first into the bore and pressed downwardly therein until the bottom portion of the battery extends slightly below the bottom of the float body; in this manner the weight of the battery will tend to stabilize the float and maintain the same on an upright keel. It will here be understood, that the diameter of the bore 6 formed in the float body should closely approximate the diameter of the battery in order that a tight frictional fit may be obtained between the two. After the battery has been inserted in the bore, it will be seen that the same will act as a wedge for the fishing line 12 and will prevent the float from slipping thereon.

In operation, the bulb 10 is screwed into the socket 9 at the time the float is being used, in order that constant illumination of the float is afforded to the fisherman. This illumination greatly aids the fisherman in night fishing, in that reference to the float and line enables the angler to ascertain whether or not a fish is striking the hook. If the illumination were not constant, the angler might easily lose visual reference to the float and possibly fail to detect a strike or bite at the proper time to "hook" the fish.

It will therefore be seen that the present invention provides both a structurally simple and mechanically efficient illuminated fish float for night fishing. Through practice, it has been found that my improved illuminated fishing float functions perfectly in the presence of "fresh" water, even upon complete immersion of the electric light bulb, the same furnishing an illuminated reference point when below the surface of the water. However, it is believed that the present invention is limited in use to "fresh" water fishing, due to the electrolytic action of salt water upon the dry cell battery, such action tending to ground the circuit of the battery, resulting in premature failure thereof.

I claim:

In combination; a buoyant float body formed with an axial bore; a dry cell battery extending completely through the bore of said float body and frictionally carried therein, said battery being formed at one end with a screw-threaded socket for the reception of an electric light bulb, said battery being unsheathed and exposed at either end to water in which said float body is positioned; an electric light bulb carried within the socket of said battery and illuminated by current therefrom; and a fishing line extending through the bore of said float body and wedged therein by said battery.

HUGH B. McGLADE.

REFERENCES CITED

The following references are of record in the file of this patent:

UNITED STATES PATENTS

| Number | Name | Date |
|---|---|---|
| 1,518,424 | Haserodt | Dec. 9, 1924 |
| 2,001,109 | Petrie | May 14, 1935 |
| 2,137,341 | Hingle | Nov. 22, 1938 |
| 2,236,215 | Klinitski | Mar. 25, 1941 |
| 2,236,384 | Samuels | Mar. 25, 1941 |